United States Patent [19]

Hart et al.

[11] Patent Number: 4,936,287

[45] Date of Patent: Jun. 26, 1990

[54] FUSIBLE LINK ASSEMBLY

[75] Inventors: Andrew J. Hart, Downsview; John Young, Bramalea, both of Canada

[73] Assignee: Nailor-Hart Industries Inc., Toronto, Canada

[21] Appl. No.: 338,003

[22] Filed: Apr. 14, 1989

[51] Int. Cl.$^5$ ............................................. F23N 3/04
[52] U.S. Cl. ................................. 126/287.5; 137/74; 137/75
[58] Field of Search .................. 137/74, 75; 126/287.5

[56] References Cited

U.S. PATENT DOCUMENTS

| | | | |
|---|---|---|---|
| 3,076,469 | 2/1963 | Averill | 126/287.5 |
| 4,263,930 | 4/1981 | McCabe | 137/80 |
| 4,295,486 | 10/1981 | McCabe | 137/80 |
| 4,366,830 | 1/1983 | Becelaere | 137/80 |
| 4,467,824 | 8/1984 | Strulik et al. | 137/74 |

*Primary Examiner*—Carroll B. Dority
*Attorney, Agent, or Firm*—Rogers, Bereskin & Parr

[57] ABSTRACT

A fire damper or the like having butterfly-type gas flow control blades includes a heat responsive blade release assembly that incorporates a standard fusible link accessible from externally of the assembly. The fusible link holds together pivoted side plates of a housing from which extends a pair of arms normally holding the blades in their open positions. When the link melts, the side plates move apart, allowing the arms to open and release the blades. The assembly is also adjustable to vary the extent to which the blades open.

14 Claims, 4 Drawing Sheets

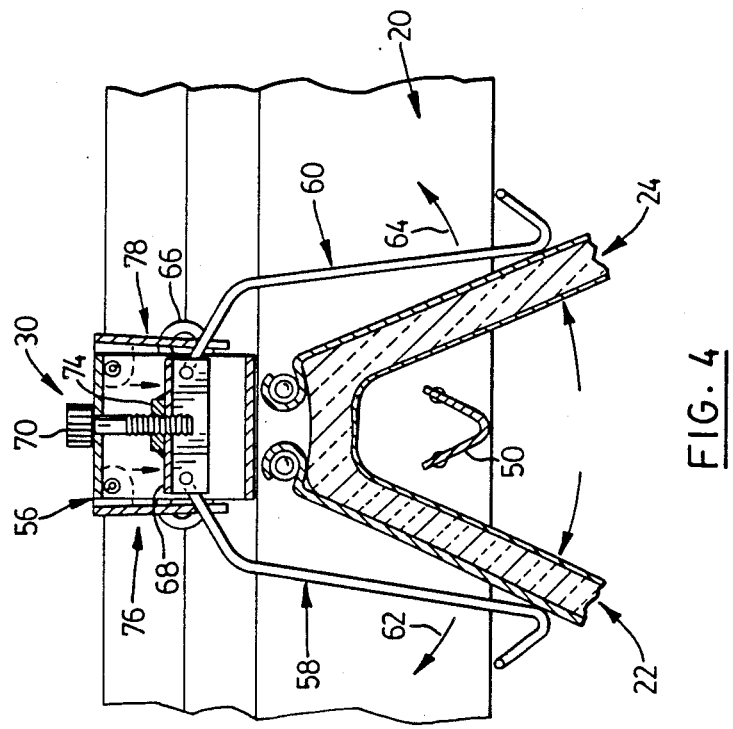

FUSIBLE LINK ASSEMBLY

FIELD OF THE INVENTION

This invention relates generally to heat-responsive gas flow control devices of the type which include at least one blade movable between an open position and a closed position. Examples of devices of this type are ceiling radiation dampers (sometimes called fire stop flaps), fire dampers and smoke dampers. The invention is concerned more particularly with a heat responsive blade release assembly for a device of this type.

BACKGROUND OF THE INVENTION

A fire damper of the type referred to typically includes a frame which may be circular or rectangular, and a pair of blades pivotally coupled the frame about parallel axes that extend across the center of the frame. Both blades can be moved between closed positions in which they extend generally in the plane of the frame and open positions in which they pivot towards one another at the same side of the frame. A damper of this configuration is often referred to as a "butterfly" damper.

A damper of this type is usually mounted in an air duct and is designed to interfit with sections of the duct. The blades are spring-biassed towards their closed positions but are normally held open by a mechanism mounted on a bar that extends across the frame parallel to the blade pivot axes. The mechanism is designed to release the blades in the event of a fire and permit them to close under the effect of their spring biassing.

DESCRIPTION OF THE PRIOR ART

U.S. patent literature includes numerous examples of prior art dampers of the type discussed previously. For example, U.S. Pat. No. 4,263,930 (McCabe) discloses a butterfly damper in which a heat-responsive latching arrangement is used to hold the blades open but is designed to release in response to an over-temperature condition and permit the blades to close. A related patent which shows a generally similar mechanism is U.S. Pat. No. 4,295,486 (also to McCabe).

U.S. Pat. No. 4,366,830 (Becelaere) shows a blade release mechanism in which the blades are held in their open positions by a pair of arms that are pivoted to a mounting bracket which, in turn, is soldered to a retainer plate held within a channel-shaped housing. When the mechanism is exposed to heat, the solder melts, allowing the retainer to separate from the plate so that the arms are freed to move apart and allow the blades to close.

A practical difficulty with a damper of this type is that it cannot conveniently be reset once the solder has melted.

BRIEF DESCRIPTION OF THE INVENTION

An object of the present invention is to provide an improved blade release assembly for a gas flow control device of the type which includes a frame, at least one blade movable between a closed position and an open position with respect to the frame, and means biassing the blade towards its closed position.

According to the invention, there is provided a fusible link assembly which includes a housing adapted to be coupled to the frame of the flow control device and an arm extending outwardly of the housing and having a portion remote from the housing for contact with the blade of the device. Means is provided coupling the arm with the housing while permitting movement of the arm between a normal operative position in which the arm bears against the blade and maintains the blade in an open position against the effect of the biassing means and an inoperative position in which the blade is permitted to move to its closed position under the influence of the biassing means. Means is also provided retaining the arm in its operative position. The retaining means includes a fusible link which is accessible from externally of the assembly and which is arranged to release the arm for movement to its inoperative position when the link is exposed to a predetermined over temperature condition.

Preferably, the coupling means is adjustable to displace the arm with respect to the housing so as to vary the open position of the blade.

The fusible link assembly of the invention has the advantage that it can be designed to accept a standard, commercially available fusible link. As such, not only can the assembly easily be reset by simply replacing the link but the assembly will always release at a known, predetermined temperature at which the link is designed to release. The links are manufactured to defined standards approved by appropriate regulatory authorities.

The fusible link assembly can be designed for different types of flow control devices such as fire and smoke dampers, fire stop flaps and ceiling radiation dampers. The assembly can be used to control a device having a single blade or two blades. In the latter event, the assembly may be designed to be mounted on a crossbar of the frame of the device and may have a pair of blade contacting arms extending from the assembly on opposite sides of the bar.

BRIEF DESCRIPTION OF THE DRAWINGS

In order that the invention may be more clearly understood, reference will now be made to the accompanying drawings which illustrate a preferred embodiment of the invention by way of example, and in which:

FIG. 4 is a somewhat simplified illustration of part of FIG. 3 showing how the assembly may be adjusted to vary the extent to which the blades of the damper are open, and hence the volume of gas flowing through the damper.

DESCRIPTION OF PREFERRED EMBODIMENT

Figure 1:
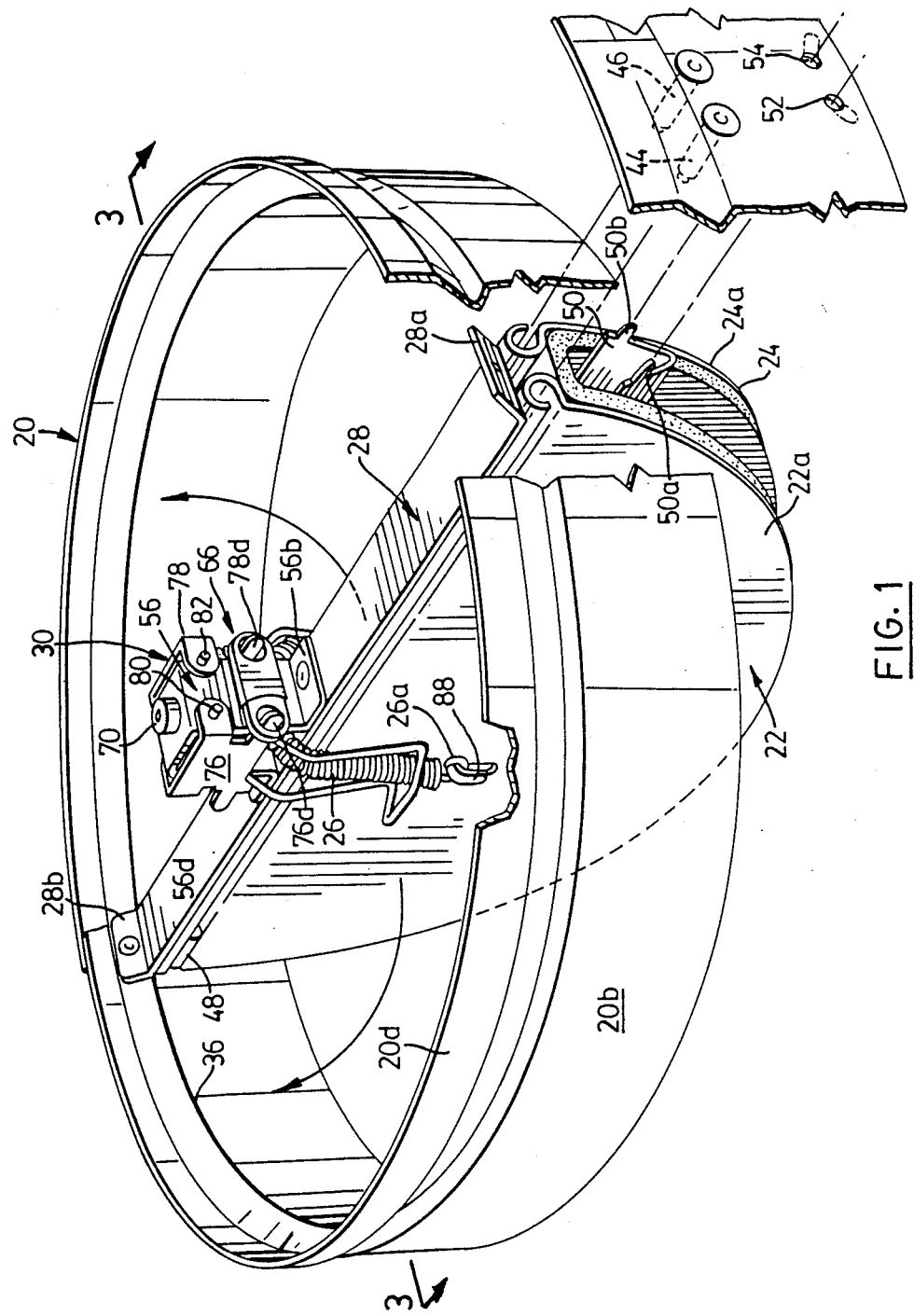
FIG. 1 is a perspective view, partly broken away and partly exploded showing a ceiling radiation damper fitted with a fusible link assembly of the form provided by the invention.
Figure 3:
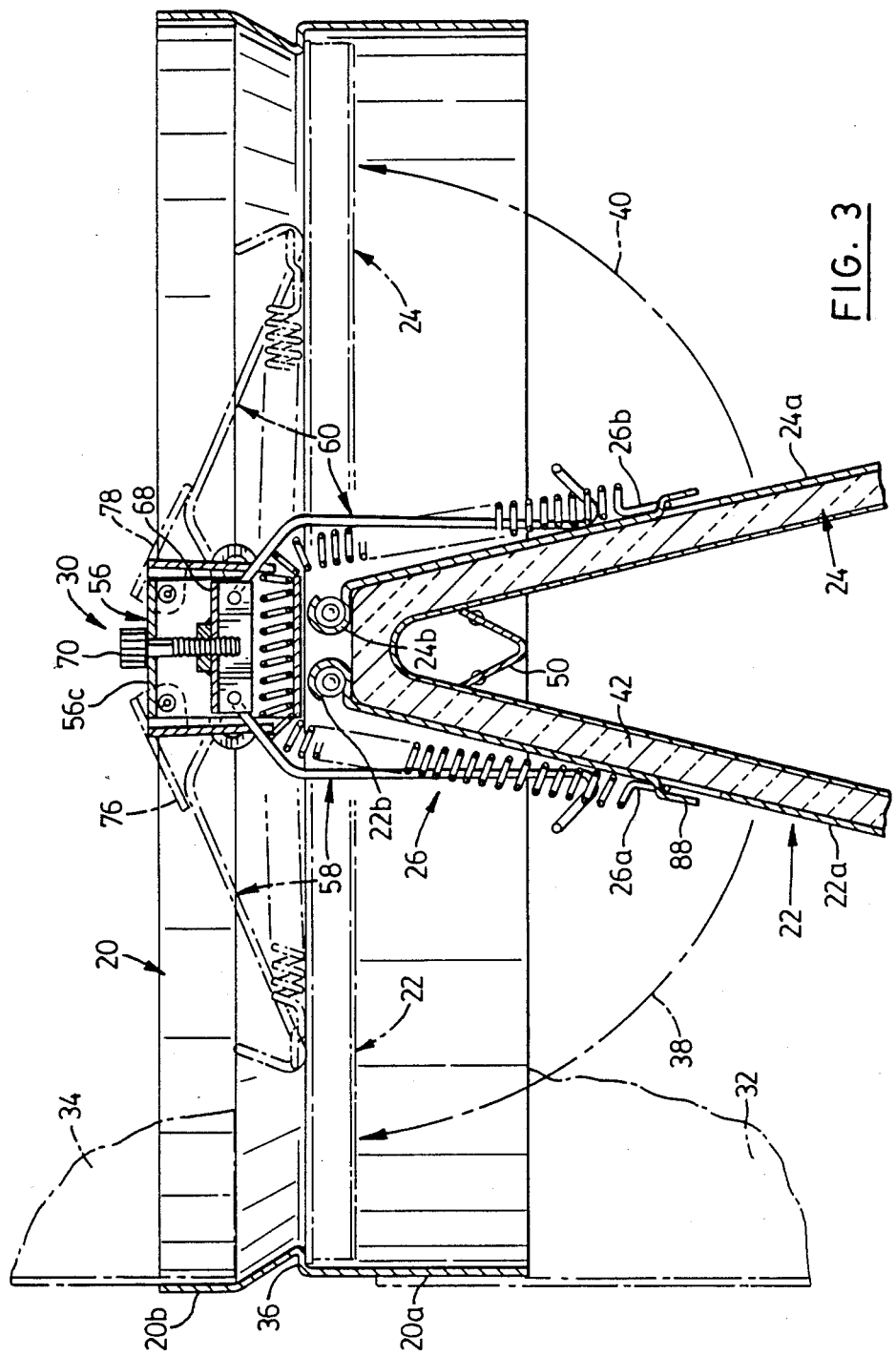
FIG. 3 is a sectional view on line 3—3 of FIG. 1.

Referring to the drawings, FIGS. 1 and 3 show a complete ceiling radiation damper in accordance with a preferred embodiment of the invention. The damper includes a circular frame 20, two blades 22 and 24 both of which are movable between open and closed positions with respect to the frame, and a spring 26 which biasses the blades towards their closed positions. The blades are shown in FIGS. 1 and 3 in their open positions, in which both blades extend parallel to one another, outwardly of a crossbar 28 that extends generally diametrically across frame 20. Crossbar 28 supports a fusible link assembly, generally designated 30, which normally holds the blades in the open positions in which they are shown. When exposed to an over-temperature condition, however, assembly 30 will release the blades and permit them to close under the influence of spring 26.

Fusible link assembly 30 will be described in detail later. In the meantime, continued reference will be made to FIGS. 1 and 3 in describing details of the remainder of the damper.

FIG. 3 illustrates the manner in which the damper may be installed in a duct represented by ductwork portions shown in ghost outline at 32 and 34. Thus, frame 20 is shaped to define respective annular end portions 20a and 20b that are dimensioned to slidingly interfit with duct portions 32 and 34 respectively. There is no particular significance to whether the duct work portions fit internally or externally of frame 20.

Between end portions 20a and 20b, frame 20 is shaped to define a continuous, inwardly directed annular shoulder or ledge 36 that forms a stop defining the closed positions of the blades 22 and 24. In FIG. 3, the blades are shown in full lines in their open positions and in ghost outline in their closed positions. Arrows 38 and 40 indicate movement of the respective blades from the full line open positions to the ghost outline closed positions. It will be seen that, in the closed positions, the blades effectively block the duct in which the fire damper is installed. In their open positions, gas flow along the duct is substantially unobstructed. As will be described in more detail later, the blades can in fact be adjusted to assume intermediate positions for regulating gas flow along the duct.

In this particular embodiment, each of the blades 22, 24 comprises a generally semi-circular shaped metal plate having a straight inner edge which is roll formed to define part of a hinge or pivot. The two plates are denoted respectively 22a and 24a and the roll formed edges of the respective plates are indicated at 22b and 24b. A circular pad of insulation, denoted 42, is secured by adhesive to the outer faces of the respective plates 22a, 24a; that is, the faces of those plates which are remote from the fusible link assembly 30 and which move towards one another when the blades pivot from their closed to their open positions. The damper will be installed in a duct so that the insulation 42 faces away from any source of heat to which the damper is likely to be exposed.

Referring back to FIG. 1, each of the blades 22, 24 is pivotally coupled to frame 20 by a pair of pivot pins that project inwardly from the frame and are received in outer end portions of the roll formed straight edge of the blade. The pivot pins for the ends of both blades that are in the foreground in FIG. 1 are indicated respectively at 44 and 46, on a portion of frame 20 that is shown exploded away from the remainder of the frame. Similar pins are provided at the opposite ends of both blades but are not shown in FIG. 1, although part of the pivot pin for the far end of blade 22 is visible at 48.

Crossbar 28 has upturned end portions 28a and 28b that are rivetted to frame 20.

In this particular embodiment, a V-shaped bar 50 extends between the blades 22, 24 parallel to and at the opposite side of bar 28 from assembly 30. Bar 50 has tabs at both ends that are received in openings in the frame and bent over to hold the bar in position. The tabs for the end of the bar that is visible in the foreground in FIG. 1 are denoted 50a and 50b and are received in holes 52 and 54 in frame 20 when the damper is assembled. The tabs are then bent over outwardly as indicated in ghost outline. Bar 50 serves as a stop for defining the fully open positions of the blades. However, the bar is not an essential component of the damper and may be omitted in some models.

FIG. 4 shows a simplified cross-sectional view through the fusible link assembly 30 and parts of the two blades 22, 24. This view will now be described in conjunction with FIG. 2, which is an exploded view showing all of the components of assembly 30.

Figure 2:
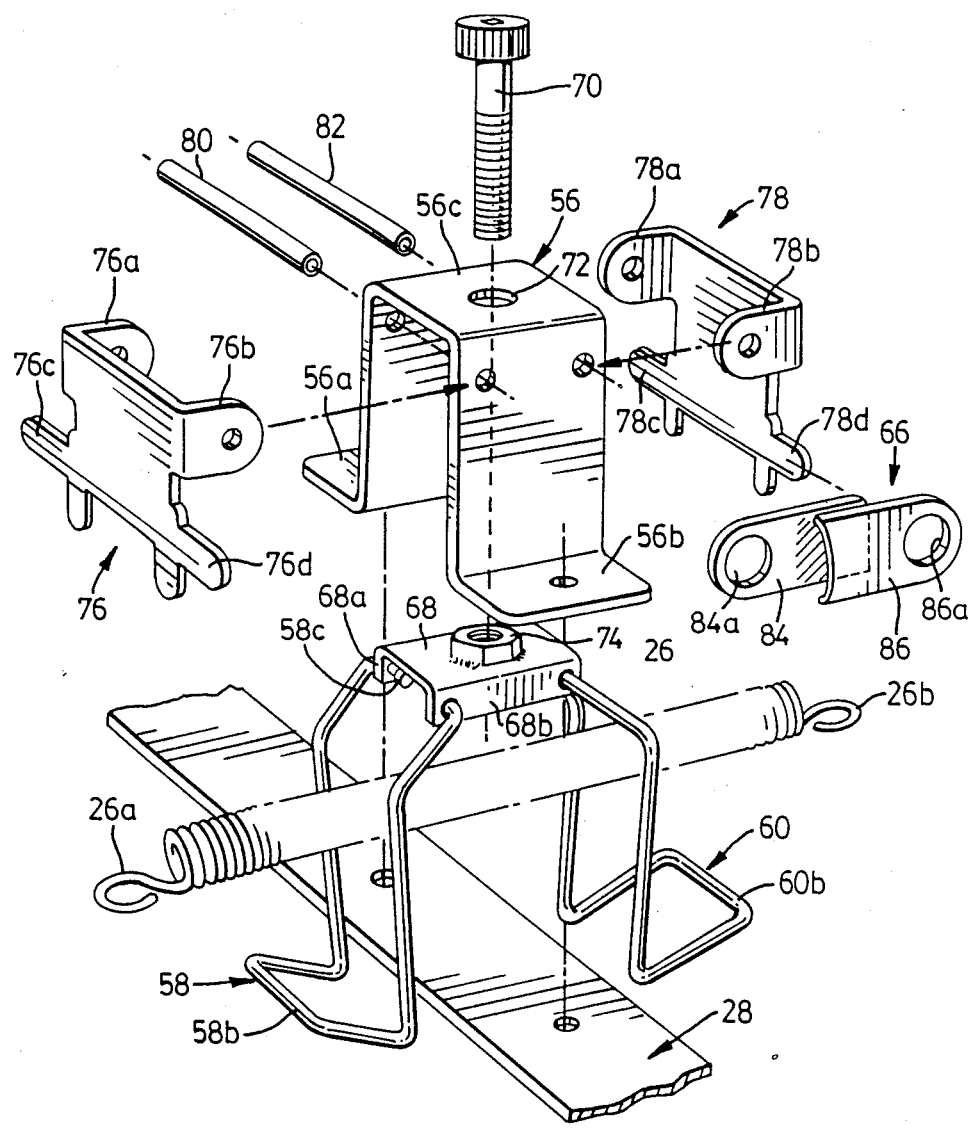
FIG. 2 is an exploded perspective view of the assembly shown in FIG. 1.

As best seen in FIG. 2, assembly 30 includes a housing, generally denoted 56, which is coupled to frame 20 by way of crossbar 28. Referring to FIG. 4, two arms 58 and 60 extend outwardly from housing 56 and have respective portions 58a and 60a remote from housing 56 that contact the respective blades 22, 24. The two arms 58, 60 are coupled to housing 56 so that they are normally maintained in the operative positions in which they are shown in FIG. 4 in which the arms bear against the blades and maintain them in open positions against the biassing effect of spring 26. For the sake of simplicity, the spring is not in fact shown in FIG. 4 but its relationship to the other components of the assembly can clearly be seen from FIGS. 2 and 3. As indicated previously, the arms are normally maintained in the operative positions shown in FIG. 4. However, when assembly 30 is exposed to an over-temperature condition, the arms are released and permitted to move apart as indicated by the arrows 62 and 64 in FIG. 4. The two arms are in fact shown in FIG. 3 in ghost outline in their inoperative positions with the blades closed.

As will be described in more detail, the fusible link assembly includes means normally retaining the arms in their operative positions, including a fusible link generally indicated at 66. Link 66 is designed to in effect melt and release the arms when the link is exposed to an over temperature condition. Provision is also made to adjust the arms to vary the open positions of the blades. Assembly 30 will now be described in more detail with particular reference to these features.

As best seen in FIG. 2, the two arms 58 and 60 are pivotally coupled at their inner ends to a carrier plate 68 that is vertically adjustable within housing 56. It will be seen that housing 56 is generally of inverted channel shape and includes outwardly extending flanges 56a and 56b by which the housing is secured to crossbar 28. When assembled, plate 68 is free to move vertically within the channel defined by housing 56. Adjustment of the vertical position of plate 68 is effected by an Allen headed bolt 70 that extends through an opening 72 in the base 56c p of housing 56, and the shank of which is received in a nut 74 welded to plate 68. The underside of the head of bolt 70 bears on the base 56c of housing 56 so that the vertical position of plate 68 can be adjusted simply by turning bolt 70. If adjustability is not required, plate 68 could be fixed with respect to housing 56.

It can also be seen from FIG. 2 that the two arms 58 and 60 are in fact formed as wire frames that are bent to define a generally J- or reverse J-shape as seen in end elevation. Each frame has similar parallel side limbs that are joined at their outer ends by respective crossbar portions 58b and 60b respectively. At their inner ends, the side limbs have respective inwardly bent end portions (such as the end portion denoted 58c) which are aligned with one another to define a pivot axis. These end portions are received in complementarily shaped openings in side flanges 68a, 68b that depend from plate 68, so that the respective arms are pivotally coupled to the plate. As can best be seen in FIG. 3, this coupling arrangement allows both arms to pivot outwardly from the operative positions in which they are shown in full lines in FIG. 3 to the inoperative position shown in ghost outline.

The arms are normally retained in their operative positions by a pair of side plates 76, 78 that are pivotally coupled to opposite sides of housing 56 so as to in effect constrain the two arms 58, 60 against outward movement. As can clearly be seen in FIG. 2, each of the plates 76, 78 has a pair of inwardly projecting limbs 76a, 76b and 78a, 78b respectively by which the side plates are pivotally coupled to housing 56 adjacent its base 56c. A pair of roll-formed pivot "pins" 80, 82 extend through aligned openings in these limbs and in housing 56 so pivotally couple the side plates to the housing.

Both plates also have respective laterally projecting tabs 76c, 76d and 78c, 78d at opposite sides. The tabs are oriented so that the tabs of the respective plates project parallel to one another and provide attachment points for fusible link 66, or for a corresponding link at the other side of the fusible link assembly. Link 66 comprises a pair of plates 84 and 86 which are shaped to partially overlap one another and which are joined together by solder in the overlapping areas. Outwardly of these areas, each plate is formed with an opening, 84a, 86a for receiving the relevant one of the pair of tabs 76c, 78c or 76d, 78d of the side plates 76, 78 of housing 56. The link and tabs are dimensioned so that the link is a relatively close press-fit onto the tabs. A tight fit is not required because the side plates are in effect biassed outwardly by virtue of the influence of spring 26 on the blades, and this biassing force is transmitted through the arms 58, 60 to the side plates.

Incidentally, it will be seen from FIG. 2 that spring 26 is accommodated within the fusible link assembly by the space below plate 68 and above crossbar 28. Thus, the spring in effect extends through the fusible link assembly as clearly illustrated in FIGS. 1 and 3. Respective eyes 26a, 26b at opposite ends of the spring are hooked on to tabs formed in the metal plates of each blade, as best seen in FIG. 1 where the tab for blade 22 is indicated at 88.

Referring back to FIGS. 2 and 4, it will be appreciated that the fusible link 66 in effect holds together the side plates 76 and 78 of housing 56 against the outward biassing effect imposed on the arms 58, 60 by spring 26. In the event of an over-temperature condition, the solder joining the two plates of the fusible link will melt, allowing the plates to separate. The side plates 76, 78 will then pivot apart as shown in ghost outline in FIG. 3, allowing the arms 58, 60 to move apart, and the blades to close.

By virtue of the fact that the fusible link 66 is mounted externally on the fusible link assembly, the link is directly exposed to any source of heat incident on the damper. As indicated previously, the damper will be installed so that the insulation 42 is at the side of the damper remote from the expected direction of incidence of heat. Consequently, of course, fusible link assembly 30 will face the direction from which heat is expected to emanate. As such, the damper is expected to be quite responsive to an over-temperature condition.

In the event that the damper is to be reset after its blades have been released, the blades can simply be manually moved to their closed positions and a new fusible link fitted to the assembly. The fusible link can be fitted to either end of the assembly, depending on convenience.

A further advantage of the invention is that the fusible link can be a standard off-the-shelf link and as such pre-approved by appropriate regulatory authorities. It is expected that this will avoid the need to have at least this aspect of the damper tested before the damper is approved for use.

It should of course be noted that the preceding description relates to a particular preferred embodiment of the invention and that many modifications are possible within the broad scope of the invention, some of which have been indicated previously. Specifically, while the drawings and description relate to a circular-shaped ceiling radiation damper having two blades, there is no limitation to these features. Frame 20 and the blades 22, 24 could be rectangular. The fusible link assembly could be applied to a damper having a single blade only, in which case only one of the two arms 58, 60 would be required. Detail constructional features such as the form and shape of the arms can of course change. Also, as indicated previously, the invention is not limited in its application to ceiling radiation dampers but may be applied to other forms of heat responsive gas flow control devices such as fire dampers, smoke dampers, and fire control dampers.

We claim:

1. A fusible link assembly for a heat-responsive gas flow control device which includes a frame, at least one blade, means pivotally coupling said blade to said frame so that said blade is movable between a closed position and an open position with respect to the frame, and means biassing the blade towards said closed position; the assembly including:

a housing adapted to be coupled to said frame;

an arm extending outwardly of said housing and having a portion remote from the housing for contact with said blade;

means pivotally coupling said arm with said housing while permitting movement of the arm between a normal operative position in which the arm bears against the blade and maintains the blade in a said open position against the effect of said biassing means, and an inoperative position in which the blade is permitted to move to its closed position under the influence of said biassing means; and, pivotal means connected to said housing retaining said arm in its said operative position including pivotal means connected to said housing and a fusible link which is accessible from externally of the assembly and which is arranged to release said pivotal means connected to said housing for releasing the arm for movement to its said inoperative position when the link is exposed to a predetermined over-temperature condition.

2. An assembly as claimed in claim 1, wherein said coupling means is adjustable to displace the arm with respect to the housing so as to vary the open position of the blade.

3. An assembly as claimed in claim 1, for use with a heat responsive gas flow control device having two said blades movable between open and closed positions, said blades being pivotally coupled to said frame about parallel pivot axes extending across said frame and the frame further including a crossbar parallel to said axes, wherein said fusible link assembly includes two said arms extending outwardly from opposite sides of the housing of the assembly, said housing being adapted to be mounted on said crossbar of the device with said arms extending to opposite sides of the crossbar for contact with the respective blades.

4. An assembly as claimed in claim 3, wherein said pivotal means connected to said housing comprises respective side plates pivotally coupled to said housing for movement between normal positions in which the side plates constrain said arms and hold the arms in said normal operative positions, and inoperative positions in which the side plates pivot outwardly with respect to the housing for permitting the arms to move to their inoperative positions, said fusible link being coupled between said side plates and normally retaining said plates in said operative positions.

5. An assembly as claimed in claim 4, wherein said fusible link comprises respective first and second plates coupled together by solder, each said plate having an opening in an outer end portion thereof, and wherein said side plates of the housing are formed with respective projecting tabs received in the respective openings in the plates of the fusible link for coupling the fusible link with said plates.

6. An assembly as claimed in claim 5, wherein said side plates are formed with respective said pairs of tabs at opposite sides so that said fusible link can be coupled to either said pair of tabs.

7. An assembly as claimed in claim 3, wherein said coupling means comprises a carrier plate to which said arms are coupled and a screw adjustable from externally of said assembly coupling said plate with said housing, said screw being turnable to move the carrier plate towards and away from the blades for varying the open positions of the blades in use.

8. A heat responsive gas flow control device comprising: a frame; at least one blade, means pivotally coupling said blade to said frame so that said blade is movable between a closed position and an open position with respect to the frame; means biassing the blade toward said closed position; and, a fusible link assembly comprising:
a housing adapted to be coupled to said frame;
an arm extending outwardly of said housing and having a portion remote from the housing for contact with said blade;
means pivotally coupling said arm with said housing while permitting movement of the arm between a normal operative position in which the arm bears against the blade and maintains the blade in a said open position against the effect of said biassing means, and an inoperative position in which the blade is permitted to move to its closed position under the influence of said biassing means; and,
pivotal means connected to said housing retaining said arm in its said operative position including pivotal means connected to said housing and a fusible link which is accessible from externally of the assembly and which is arranged to release said pivotal means connected to said housing for releasing the arm for movement to its said inoperative position when the link is exposed to a predetermined over-temperature condition.

9. A device as claimed in claim 8, wherein said coupling means is adjustable to displace the arm with respect to the housing so as to vary the open position of the blade.

10. A device as claimed in claim 8, further comprising a crossbar extending across said frame generally centrally thereof, and wherein said device includes two said blades pivotally coupled to the frame for movement between said open and closed positions on respectively opposite sides of said crossbar, and wherein said housing is mounted on said crossbar and includes two said arms extending outwardly of said housing for contact with the respective blades.

11. A device as claimed in claim 10, wherein said pivotal means connected to said housing comprises respective side plates pivotally coupled to said housing for movement between normal positions in which the side plates constrain said arms and hold the arms in said normal operative positions, and inoperative positions in which the side plates pivot outwardly with respect to the housing for permitting the arms to move to their inoperative positions, said fusible link being coupled between said side plates and normally retaining said plates in said operative positions.

12. A device as claimed in claim 11, wherein said fusible link comprises respective first and second plates coupled together by solder, each said plate having an opening in an outer end portion thereof, and wherein said side plates of the housing are formed with respective projecting tabs received in the respective openings in the plates of the fusible link for coupling the fusible link with said plates.

13. A device as claimed in claim 12, wherein said side plates are formed with respective said pairs of tabs at opposite sides so that said fusible link can be coupled to either said pair of tabs.

14. A device as claimed in claim 10, wherein said coupling means comprises a carrier plate to which said arms are coupled and a screw adjustable from externally of said assembly coupling said plate with said housing, said screw being turnable to move the carrier plate towards and away from the blades for varying the open positions of the blades in use.

* * * * *